United States Patent [19]

Chan

[11] 4,014,033
[45] Mar. 22, 1977

[54] PERCUSSIVE FLASH UNIT OPERATING MECHANISM

[75] Inventor: Kwok Yan Chan, North Point, Hong Kong

[73] Assignee: W. Haking Industries, Ltd., Victoria, Hong Kong

[22] Filed: Feb. 11, 1975

[21] Appl. No.: 548,904

[52] U.S. Cl. .................. 354/142; 240/1.3
[51] Int. Cl.² ...................... G03B 15/04
[58] Field of Search .......... 354/142, 143, 144, 148, 354/126; 240/1.3

[56] References Cited

UNITED STATES PATENTS

| | | | |
|---|---|---|---|
| 3,588,300 | 6/1971 | Sturm | 354/142 X |
| 3,633,477 | 1/1972 | Hackenburg | 240/1.3 X |
| 3,675,565 | 7/1972 | Pagel | 354/148 |
| 3,705,539 | 12/1972 | Wagner | 354/142 |
| 3,719,126 | 3/1973 | Engelsmann et al. | 354/142 X |
| 3,736,853 | 6/1973 | Suzuki | 240/1.3 X |
| 3,777,641 | 12/1973 | Winkler et al. | 354/142 |
| 3,824,610 | 7/1974 | Ort et al. | 354/142 X |
| 3,854,810 | 12/1974 | Ettischer et al. | 354/142 |

Primary Examiner—Edna M. O'Connor
Attorney, Agent, or Firm—Wallenstein, Spangenberg Hattis & Strampel

[57] ABSTRACT

A unique percussive flash unit includes an initially cocked striker and flash unit rotating assembly, which includes a main member with an inclined laterally projecting cam-forming wall having an inclined cam face which engages and cams outwardly a lateral extension of an actuator and striker holding member to operate a percussive flash unit when the cocked striker and flash unit rotating assembly is released by operation of a shutter release member. The actuator and striker holding member then returns to its initial position, and when the striker and flash unit rotating assembly is cocked during a shutter resetting operation, the lateral extension of the actuator and striker holding member is moved out of the way of the cam-forming wall by the engagement with the member of a portion of the flash unit socket as it is rotated by a portion of the striker and flash unit rotating assembly so the cam-forming wall will not strike the lateral extension. The actuator and striker holding member includes a shoulder which prevents the movement of the striker and flash unit rotating assembly from its cocked to its uncocked position when a flash unit is not mounted upon the camera.

6 Claims, 12 Drawing Figures

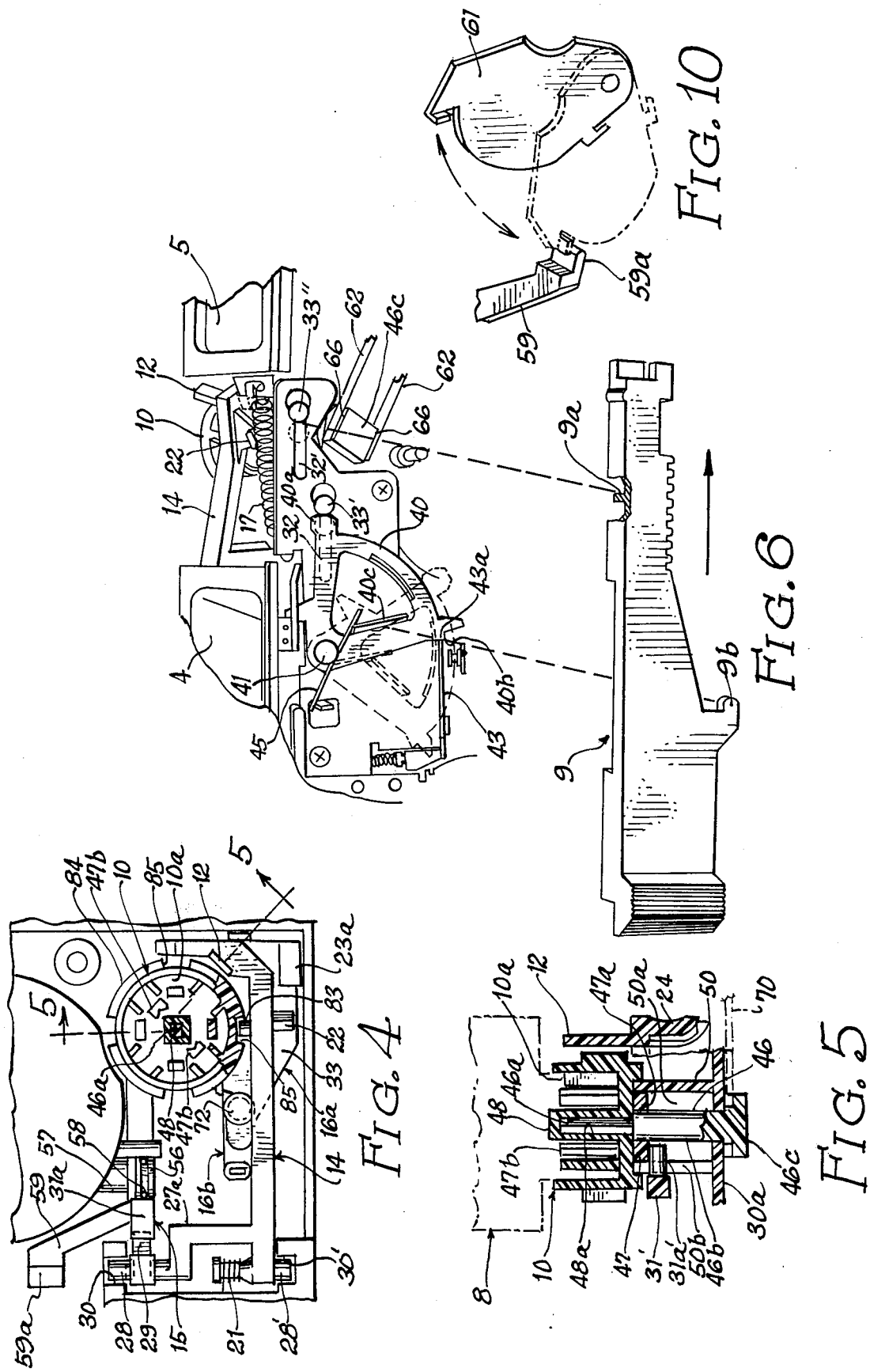

PERCUSSIVE FLASH UNIT OPERATING MECHANISM

BACKGROUND OF THE INVENTION

This invention relates to mechanism for operating a percussive flash unit which commonly comprises a unit with a number of flash lamp and reflector sections spaced around a central axis coextensive with the axis of rotation of a flash unit-receiving socket exposed generally on the upper wall of the camera housing. In a percussive flash unit, a flash operation is initiated by operation of a shutter release member which, in addition to actuating the shutter, moves an actuator finger upwardly above the plane of the flash unit-receiving socket, where it enters the flash unit and strikes a portion thereof which causes the ignition of a light producing material. The flash unit-receiving socket is generally rotated 90° by reciprocation of a film winding and shutter resetting member accessible on the outside of the camera housing. Many diverse motion coupling mechanisms have been developed for operating the flash actuator finger and rotating the flash unit-receiving socket in response to operation of the shutter release and film winding and shutter resetting member. A flash unit sensing member is generally provided which, when a flash unit is mounted in position upon the camera housing, is moved to adjust the timing of the shutter mechanism to a slower speed than used for non-flash operation.

In one camera disclosed in U.S. Pat. No. 3,602,120, the member which directly contacts a portion of the flash unit to initiate a flash operation is a cocked member which is moved into a spring-energized cocked position during the film winding and shutter resetting operation. The cocked member is permitted to be released upon actuation of the trigger release member when a flash operation is desired, and is held in its cocked position despite operation of the trigger release member if a flash operation is not desired, as when a flash unit is not inserted into the camera. An extension of the cocked member prevents a flash unit rotating operation from taking place during a film winding and shutter resetting operation, so that the flash unit is not rotated except after a flash operation of the camera.

The provision of a flash operating member which is spring-energized in a cocked position and released to effect a flashing operation during operation of the shutter release member has the advantage that a light release force can be provided on the trigger release member. Also, since the cocked member remains in its energized state until a flash operation of the camera is desired, the continued non-operation of the cocked member results in the saving of the stored energy therein.

The present invention deals with a flash operating mechanism utilizing a cocked striker member, but which is constructed and operates in a manner quite different from that disclosed in U.S. Pat. No. 3,602,120. More specifically, it relates to a unique mechanism for operating a flash unit and rotating the flash unit-receiving socket of the camera using a minimum number of parts which can be easily assembled for reliable operation without any critical adjustments.

SUMMARY OF INVENTION

In accordance with one of the aspects of the present invention, the striker member is mounted for movement from an uncocked to a cocked position in response to operation of the manually operable film winding and shutter resetting member. The striker member includes projecting means positioned to effect the application of a flash initiating force against the flash producing portion of a percussive flash unit mounted on the camera during the movement of the striker member from its cocked to its uncocked position. Unlike the cocked member in said U.S. Pat. No. 3,602,120, the projecting means thereon cooperates with a portion of a member referred to sometimes as an actuator and striker holding member and sometimes only as a striker holding member, which member serves several functions. This portion of the striker holding member is engaged by the projecting means on the striker member to drive the same outwardly where an actuator portion of the striker holding member directly contacts a portion of the flash unit to initiate a flash operation. The striker holding member has different positions respectively during the presence and absence of a flash unit on the camera. It has a shoulder which holds the striker holding member in its cocked position when there is no flash unit on the camera housing.

The contacting portions of the striker member and the striker holding member which effect a flash operation during the presence of a flash unit on the camera housing are designed so that a flash operation is not repeated during the cocking of the striker member. In its most preferred form, when a flash unit is mounted on the camera housing the striker holding member is spring urged into a reference position where it permits the movement of the striker member from its cocked to its uncocked position. After the striker holding member is engaged by the projecting means of the striker member during the movement of the striker member from its cocked position and the striker holding member is impelled outwardly to initiate a flash operation, the striker holding member returns to its reference position. In accordance with a specific aspect of the invention, the projecting means which engages a portion of the striker holding member to effect a flash operation during release of the striker member from its cocked position is most advantageously a laterally extending cam-forming wall having a cam surface facing a lateral extension on the striker holding member and inclining away from the lateral extension in the direction of movement of the striker member from its cocked position. This inclined cam surface engages the lateral extension of the striker holding member and cams the same outwardly to effect the flash operation when the striker member is released from its cocked position. When the striker member is returned to its cocked position, the lateral extension on the striker holding member is positioned on the side of the laterally extending cam-forming wall facing away from the striker holding member as the wall passes thereby when the striker member is returned to its cocked position, so that the flash unit is not undesirably operated at that time.

In accordance with a further aspect of the present invention, the aforementioned striker member has mounted upon it a flash unit rotating member which forms with the striker member what is referred to as a striker and flash unit operating assembly. The flash unit rotating member is preferably mounted for lateral movement upon the striker member and is urged by a spring into a lateral position where it will engage a part of the flash unit socket assembly and rotate the same 90° only during the return of the striker member carrying the flash unit rotating member to its cocked position. This brings an unused section of the flash unit into position for a new flash operation. During rotation of the flash socket, a cam surface on the flash unit socket preferably engages a pin on the striker holding member 5 and depresses the same to position said lateral extension out of the path of movement of said cam-forming wall.

With the features of the invention described, a very reliably operating flash unit operating and flash unit rotating mechanism results which comprises a minimum number of reliably operating parts which can be inexpensively fabricated and assembled.

Other advantages and features of the invention will become apparent upon making reference to the specification to follow the claims and the drawings.

DESCRIPTION OF DRAWINGS

FIG. 4 is a fragmentary top plan view of the mechanism shown in FIGS. 2 and 3, with the flash unit socket broken away;

FIG. 5 is a vertical sectional view through the flash unit socket and associated portions of the camera, taken along section lines 5—5 in FIG. 4;

FIG. 6 is a fragmentary bottom exploded perspective view of the mechanism support frame and the film winding and shutter resetting member and includes showing of the means for latching the striker and flash unit rotating assembly, and the means for retaining the tube socket in any one of four different angular positions;

FIG. 10 is a perspective view showing respectively in solid and dashed lines the different positions of the shutter speed control arm when a flash unit is respectively absent from and present on the camera housing.

DESCRIPTION OF PREFERRED FORM OF INVENTION

Figure 1:
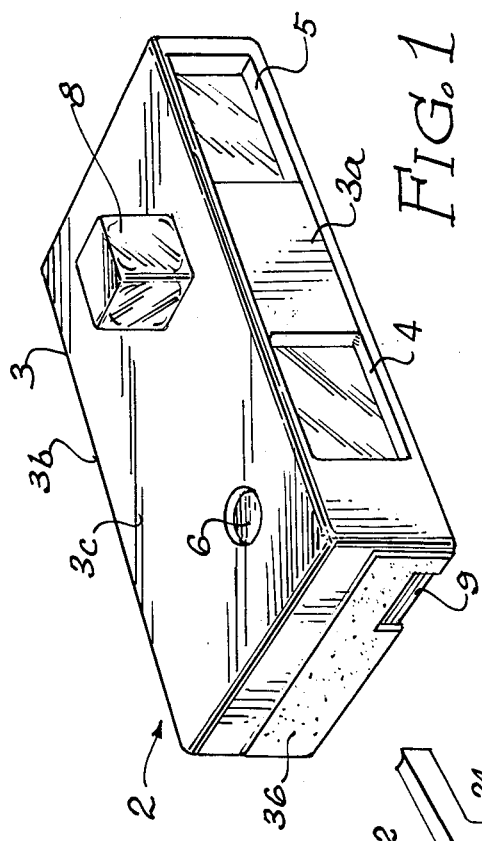
FIG. 1 is a perspective view of a typical pocket-sized camera with a percussive flash unit in place on the top wall thereof, in which camera the present invention is incorporated as illustrated in the other figures of the drawing.
Figure 3:
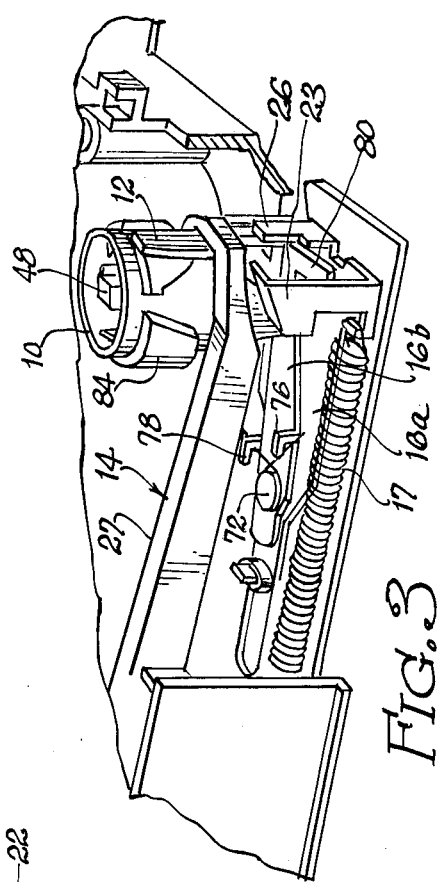
FIG. 3 is a perspective view of the flash unit operating and rotating mechanism illustrated in FIG. 2, as viewed from another angle, and when the flash unit is not mounted on the camera.
Figure 2:
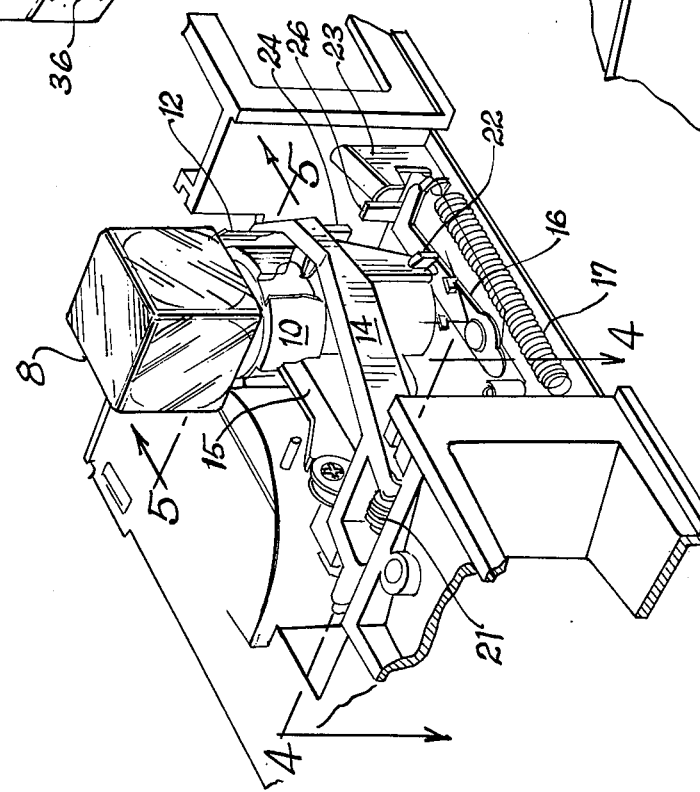
FIG. 2 is an enlarged fragmentary perspective view of the flash unit operating and rotating mechanism of the invention in the camera of FIG. 1 with the housing removed and when a percussive flash unit is mounted on the camera.
Figure 7:
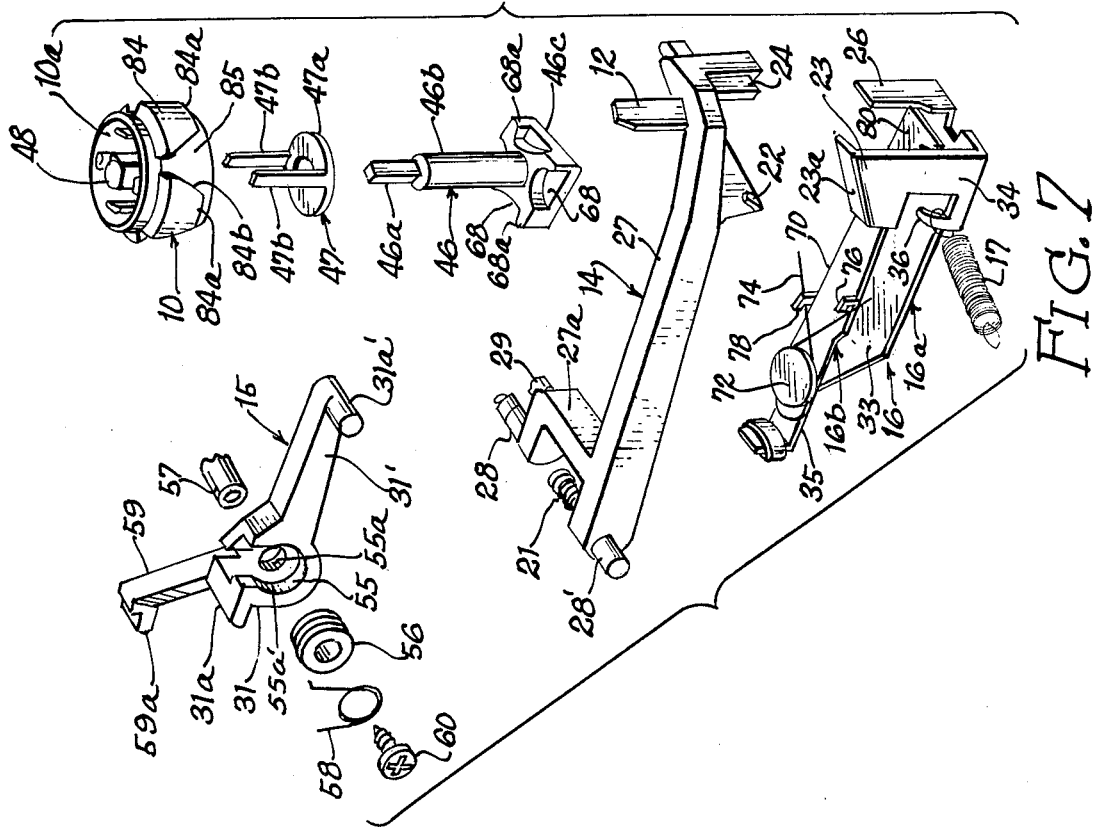
FIG. 7 is an exploded perspective view of the main components of the flash unit operating and rotating mechanism of the invention.

Refer now more particularly to FIG. 1, which illustrates a typical pocket-sized camera 2 which has a housing 3 which is relatively thin in a vertical dimension and has a horizontally elongated shape and size which permits it to fit readily within a shirt pocket when a flash unit is not connected thereto. As there shown, the front wall 3a of the housing 3 has a lens opening 4 with which is aligned the usual picture focusing lens elements and shutter mechanism (not shown). The front wall 3a of the housing 3 also includes a viewfinder opening 5 with which viewfinding lens elements (not shown) are in alignment. There is usually provided in the housing 3 a rear closure door 3b which pivots down into a position permitting the insertion of a film magazine into the rear of the housing 3. As in conventional, the top wall 3c of the housing 3 has exposed thereon a shutter release or trigger button 6 which, when depressed, operates the aforementioned shutter mechanism, and when flash operation is desired also initiates operation of a percussive flash unit 8 mounted within socket 10 (FIGS. 2 and 3) exposed in the top wall of the housing. There is generally exposed at the bottom and to one end of the housing 3 a manually reciprocable film winding and shutter resetting member 9. The film winding and shutter resetting member 9 also is operative to rotate the flash unit-receiving socket 10 at the same time that the film winding and shutter resetting operations take place. The present invention deals with the unique construction of the mechanism which operates the flash unit 8 and rotates the flash unit-receiving socket 10 respectively in response to the depression of the shutter release button 6 and the reciprocation of the film winding and shutter resetting member 9. A perspective view of this mechanism is shown in FIGS. 2, 3 and 7 to which reference should now be made.

Exposed for movement above the plane of the top of the socket 10 is a flash unit actuating finger 12 projecting upwardly from an actuator and striker holding member 14, which may be a member molded from a suitable synthetic plastic material. In a manner to be described, the actuator and striker holding member 14 is mounted for pivotal movement about a horizontal axis and is spring urged in an upward direction toward the top wall of the camera housing 3. When the flash unit 8 is mounted on the camera housing, a hold down member 15 mounted for pivotal movement about a transverse horizontal axis assumes a position where it permits the actuator and striker holding member 14 to assume an intermediate elevated position where the top of the actuating finger 12 is approximately at or near the plane of the upper face of the top wall 3c of the camera housing 3. The hold-down member 15, which may be made of a molded synthetic plastic material, is a spring urged member which assumes a first position when the flash unit 8 is mounted on the camera housing where the actuator and striker holding member 14 has the reference position just described, and assumes a second position when the flash unit 8 is removed from the top of the camera housing 3 where it pushes the actuator and striker holding member 14 into a lowermost position where it holds a striker and flash unit rotating assembly 16 in a cocked position.

The actuator and striker holding member 14 is impelled upwardly to cause the flash unit actuator finger 12 thereof to enter the forwardly facing section of the flash unit 8 and operate the same when the striker and flash unit rotating assembly 16 is released from its cocked position when the trigger button 6 is depressed and moves under the force of a coil spring 17. During the ensuing movement of the assembly 16 to its uncocked position, the upper face 23a of an inclined laterally extending cam-forming wall 23 is moved against a lateral extension 22 of the actuator and striker holding member 14. The upper face 23a of the cam-forming wall 23 inclines away from the lateral extension 22 in the direction of movement of the striker and flash unit rotating assembly 16 from its cocked position, and in contacting the same forces the striker holding member 14 upwardly or outwardly into a flash initiating position. The spring force acting upon the hold-down member 15 is overcome by the force of the cam-forming wall 23 acting upon the lateral extension 22, but once the cam-forcing wall passes the lateral extension 22, the spring force acting on the actuator and striker holding member 14 will return it to its initial intermediate elevated position, as previously described.

When the actuator and striker holding member 14 is pushed into its lowermost position by the hold-down member 15 when the flash unit 8 is absent from the camera housing, a shoulder 24 on the end of the member 14 will be in the path of movement of a stop finger 26 projecting upwardly from one end of the striker and flash unit rotating assembly 16, to prevent movement of the assembly 16 substantially from its fully cocked position. When the striker and flash unit rotating assembly 16 is returned to its cocked position upon the operation of the film winding and shutter resetting member 9, the cam-forming wall 23 will be in a position above the lateral extension 22, so that a flash operation will not occur during the cocking of the assembly 16.

The striker and flash unit rotating assembly 16 preferably includes two metal stampings forming a striker member 16a, of which the cam-forming wall 23 and the stop finger 26 are integral extensions, and a flash unit rotating plate 16b pivoted for movement upon the striker member 16a in a manner to be described.

Now that the basic mode of operation of the flash unit operating and flash unit rotating mechanism of the invention has been briefly introduced, the specific details of the most preferred form of this mechanism will now be described, it being understood that numerous modifications may be made in this mechanism without deviating from the more basic aspects of the invention.

As illustrated, the actuator and striker holding member 14 has a main elongated arm portion 27 from one end portion of which the aforementioned lateral extension 22, flash unit actuating finger 12 and stop shoulder 24 extend. The end of the arm 27 remote from the end having the various projections just described has a L-shaped lateral extension 27a from the end portion of which laterally projects a pivot-forming pin 28 and a shoulder-forming projection 29. Extending laterally from the latter end of the arm 27 in alignment with the pivot-forming pin 28 is another pivot-forming pin 28'. The pivot-forming pins 28 and 28', are rotatably mounted in spaced confronting sockets 30 and 30' (FIG. 4). A cross spring 21 surrounds a projection 27b at the latter end of the arm 27 and is anchored to provide a torgue on the actuator and striker holding member 14 which pivots the same in a counterclockwise direction tending to raise the flash unit actuating finger 12. The hold-down member 15 has an arm 31 terminating in a hold-down projection 31a which presses upon the shoulder-forming projection 29 of the actuator and striker hold-down member 14, to control the elevation of the member 14 in a manner previously explained.

The striker member 16a forming part of the striker and flash unit rotating assembly 16 is guided for movement in the bottom wall 30a of a support frame 30 which supports most of the operating mechanism of the camera. The bottom wall 30 (FIG. 6) of the frame has longitudinally extending slots 32 and 32' in which are guided headed pins 33'—33' projecting from the striker member 16a. The striker member 16a may be made of a metal stamping (FIG. 7) having a main body portion 33 from which extends at one end a vertical wall 34 terminating in the aforementioned laterally extending cam-forming wall 23. The stop finger 26 projects upwardly from the main body portion 33 of the striker member 16a, and the striker member has a rear portion 35 at the opposite end thereof on which is pivotally mounted for movement in a horizontal plane the flash unit rotating plate 16b.

The aformentioned coil spring 17 which urges the striker and flash unit rotating assembly to its uncocked position extends between a tab 36 on the striker member 16a and a portion of the frame 30. The striker member 16a is held in its cocked position by a spring urged latching member 40 (FIG. 6) which has a nose portion 40a which engages the head portion of a pin 31'. The latching member 40 is pivoted for movement about a vertical axis at 41 and is held in a latching position against the force of a spring 45 urging the same in a clockwise direction by the end 43a of a spring biased arm 43 which abuts a shoulder 40b on the latching member. The arm 43 is moved to a position where the end thereof moves away from the shoulder 40b by a suitable linkage responding to the depression of the shutter release button 6. When the film winding and shutter resetting member 9 is moved longitudinally from the position in FIG. 1, a shoulder 9a thereof engages and moves the striker member 16a and the pins 33'-33" to the right and a projection 9b thereof engages a wall 40c of the latching member 40 to rotate the same counterclockwise to a position where it latches the pin 33' of the striker member 16a. The latching member 40 is then latched by the arm 43.

To understand the manner in which the mechanism described responds to the insertion of the flash unit into or the removal of the flash unit from the socket 10 and the manner in which the socket 10 is rotated when the striker member 16a is moved from its cocked position, reference shall now be made to FIGS. 4, 5 and 7. The socket 10 forms part of an assembly including a flash unit socket shaft 46 and a flash unit sensing member 47. The flash unit socket shaft 46 has a rectangular upper end 46a which is friction fitted within a correspondingly shaped passageway 48a formed within a center post 48 of the socket 10. The flash unit socket shaft 46 has a cylindrical central portion 46b which passes through a much larger cylindrical passageway 50a of a cylindrical boss 50 (FIG. 5) extending upwardly from the mechanism support frame 30. The cylindrical portion 46b of the flash unit socket shaft 46 terminates at the bottom thereof in a rectangular horizontally projecting base 46c located on the bottom side of the bottom wall 30a of the support frame 30.

The firm sensing member 47 has a circular base portion 47a which is mounted for vertical sliding movement within the cylindrical interior of the boss 50, and surrounds the smaller cylindrical portion 46b of the flash unit socket shaft 46. Extending upwardly from the base 47a of the flash unit sensing member 47 are fingers 47b—47b which project upwardly within the opening 10a in the socket 10. The rearwardly facing side of the frame boss 50 has a slot 50b (FIG. 5) formed in the wall thereof through which extends a projection portion 31a' of an arm 31' of the hold-down member 15. The bottom face of the flash unit sensing member base 47a bears on the top of the projecting portion 31a'. The central portion of the hold-down member 15 has a small recess 55a (FIG. 7) and fits over a frame post 57. A metal bearing-forming sleeve 56 fits within the recess 55 and passes around the post 57. The assembly of the hold-down member 15 and sleeve 56 is held on the post by an angular screw 60. A suitable spring member 58 is provided having arms anchored to the member 15 and bearing forming sleeve 56 which provide a counterclockwise torgue on the hold-down member 15 which, in the absence of a flash unit in the socket 10, lowers the hold-down projection 31a at the end of the arm 31 to move the actuator and striker hold-down member to its striker holding position and raises the arm end projection 31a' contacting the bottom face of the base 47a of the flash unit sensing member 47.

There is a snap-fit relationship between the conventional shaped percussive flash unit 8 and the defining walls of the socket opening 10a which is also of a conventional shape, and this snap-fit pushes the flash unit sensing member down to rotate the hold-down member is clockwise against the restoring force of the spring 58. This raises the arm 31 thereof, permitting the actuator and striker holding member 14 to move upwardly into its intermediate position, where the stop shoulder 24 is out of the path of movement of the stop finger 26 of the striker member 16a. When the striker member 16a is thereafter released from its cocked position, the resulting upward movement imparted to the actuator and striker holding member 14 overcomes the spring force imparted by the spring 58, to permit the flash unit actuating finger 12 to enter the flash unit 8 and effect a flash operation in the conventional way.

The hold-down member 15 has a shutter timing control arm 59 (FIG. 10), the end 59a of which may, as illustrated, acts as an abutment for a shutter blade 61 during non-flash operation, so that the shutter blade rebounds quickly to provide a minimum exposure time. The arm end 59a is positioned out of the path of movement of the shutter blade to provide a longer exposure during flash operation.

The base portion 46c of the flash unit socket shaft 46 is held in any one of four different angular positions spaced 90° apart by a pair of spring arms 62—62 (see FIG. 6) mounted on the bottom of the support base 30, so as to be urged against a pair of opposite flat sides 66—66 of the base 46c.

As previously indicated, when the striker and flash unit rotating assembly 16 is reset to its cocked position during the initial reciprocation of the film winding and shutter resetting member 9, a flash socket rotating operation is effected by the flash unit rotating plate 16b pivotally mounted upon the striker member 16a. The flash unit rotating plate 16b is pushed against the base portion 46c of the shaft 46 with a force which overcomes the force of the springs 62—62 to rotate the flash unit socket shaft 46 during the initial inward movement of the film winding and shutter resetting member 9 which is spring returned to its outer position. The flash unit rotating plate 16b has a flat elongated body portion 70 having a nose 80 at the end thereof remote from the end pivotally mounted upon the striker member 16a, which nose has a straight flat front edge 80a facing the base portion 46c of the flash unit socket shaft 46 when the striker and flash unit rotating assembly 16 is in its uncocked position. The body portion 70 has a lug 76 projecting upwardly therefrom against which one leg of a spring 74 bears. The spring 74 winds around a pivot-forming pin 72, and the other end of the spring 74 has a leg engaging a lug 78 extending upwardly from the main body portion 33 of the striker member 16a. The spring 74 urges the main body portion 70 of the flash unit rotating plate 16b in a counterclockwise direction as viewed in the drawings, the lateral movement of the flash unit rotating plate 16b being limited by the contact of the body portion 70 thereof with the lug 78 extending upwardly from the striker member 16a.

Figure 8A:
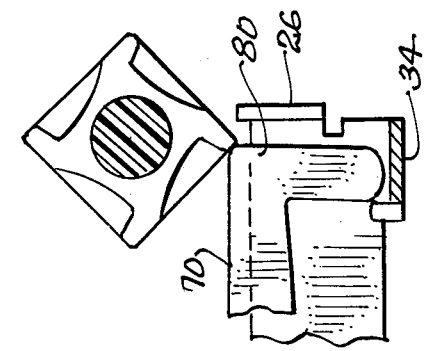
FIG. 8A is a view showing the position of the base of the flash unit socket shaft when the nose of the flash unit rotating plate has made contact therewith.
Figure 8B:
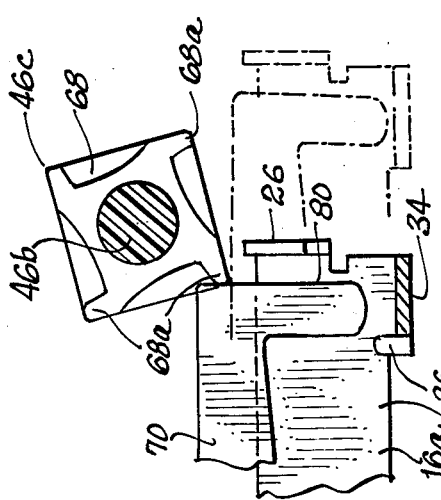
FIG. 8B illustrates the position of the flash unit socket shaft as the nose portion of the flash unit rotating plate has rotated said base just beyond 45° from its position shown in FIG. 8A.

The base 46c of the flash unit socket shaft 46 has formed in each side thereof a clearance-forming as shown in FIG. 8A forming shoulder-forming projections 68a. As shown in FIG. 8a, one of these projections 68a is in the path of movement of the nose 80 of the flash unit rotating plate 16b as the striker and flash unit rotating assembly 16 is moved from its uncocked to its cocked position. Near the end of the path of movement of the assembly 16 to its cocked position, the flash unit rotating plate will have rotated the socket shaft just over 45° as shown in FIG. 8B where the force of the spring arms 62—62 will complete the rotation of the socket to its next position. Since the flash unit rotating plate 16b assumes different lateral positions upon the striker member 16a as it is moved to its cocked position, the flash unit rotating plate 16b must be mounted for lateral movement as described. When the striker and flash unit rotating assembly 16 is released from its cocked position, the nose 80 slides around the base portion 46c of the flash unit socket shaft 46 as it moves laterally upon the striker member 16a.

Figure 9A:
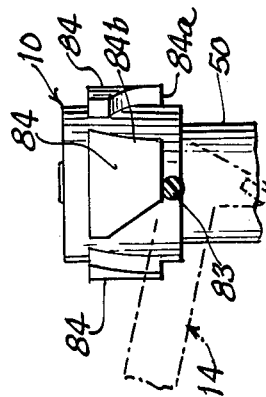
FIGS. 9A and 9B respectively are elevational views showing the manner in which the actuator and striker holding member is cammed into a downward position during a flash unit socket rotating operation.
Figure 9B:
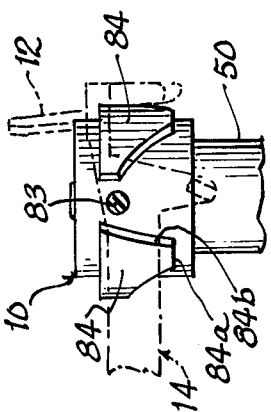

As previously indicated, during the return of the striker and flash unit rotating assembly 16 to its cocked position, it is important that the lateral extension 22 of the actuator and striker holding member 14 not be raised by the engagement therewith by the outer face 23a of the cam-forming wall 23. To ensure that the lateral extension 22 is positioned out of the path of movement of this cam-forming wall during the cocking of the assembly 16, as best shown in FIGS. 9A and 9B, the member 14 is provided with a laterally extending cam follower pin 83 which is normally located within one of the recesses 85 formed between pairs of lateral cam-forming projections 84 on the outside of the socket 10. Each cam-forming projection as it is operatively positioned to face the actuator and striker holding member 14 has a bottom surface 84a and a slightly downwardly facing inclined side surface 84b on a side thereof normally facing in the direction of movement of the striker and flash unit rotating assembly to its cocked position. As best shown in FIG. 9B, when the socket 10 is being rotated by the nose 80 of the flash unit rotating plate 16b, the socket side surface 84b will engage the cam follower pin 83 extending from the actuator and striker holding member 14 and apply a downward force thereto, which causes the cam follower pin 83 to drop to a point where it rides along the bottom edge 84a of the latter socket cam-forming projection 84, until the pin 83 once again enters the next socket recess 85.

The present invention has thus provided a very reliable and easy to assemble mechanism for both operating and rotating a percussive flash unit when a flash unit is in place in the camera, and for preventing the uncocking of a pre-energized striker and flash unit rotating assembly during the absence of a flash unit from the camera.

It should be understood that numerous modifications may be made in the most preferred form of the invention without deviating from the broader aspects thereof.

It should be understood that numerous modifications may be made in the most preferred form of the invention without deviating from the broader aspects thereof.

I claim:

1. In a still camera including a housing having shutter means operative to expose film in the housing, manually operable trigger means including a portion exposed to the outside of the camera housing for manual operation for operating the shutter means to effect a picture taking operation, and manually operable shutter resetting means exposed to the outside of the housing for advancing the film and resetting the shutter for operation by said manually operable trigger means, and a flash unit-receiving means exposed to the outside of the camera housing for receiving a flash unit of the percussive type requiring a force against a flash producing portion thereof to effect a flash operation, the improvement comprising striker means mounted for movement, in response to operation of said manually operable shutter resetting means, from an uncocked to a cocked position and including force applying means positioned so as to be able to effect the application of a flash initiating force against a flash producing portion of a unit in said flash unit-receiving means during the movement of said striker means from its cocked to its uncocked position, spring means for urging said striker means from said cocked to said uncocked position, means for releasing said striker means from said cocked position upon operation of said manually operable trigger means unless hindered from being so released, and a striker holding member having first and second positions when a flash unit is respectively inserted into and removed from said flash unit-receiving means, said striker holding member including as a part thereof an actuator portion positioned to engage a flash producing portion of a flash unit in said flash unit-receiving means, and a striker holding portion which is respectively out of and in the path of movement of a portion of said striker means when said striker holding member is in said first and second positions, said striker holding portion stopping any movement of said striker means to its fully uncocked position when said striker holding portion is in the path of movement of said striker means, the striker holding means permitting the movement of said striker means to its fully uncocked position when said striker holding portion is out of the path of movement of said striker means, said striker holding member having a force receiving means in the path of movement of said force applying means when the striker means is permitted to be moved to its fully uncocked position which force applying means then moves said striker holding member into a position where said actuator portion there is capable of contacting the flash producing portion of a flash unit in the flash unit-receiving means.

2. The still camera of claim 1 wherein said striker holding member in the path of movement of said force applying means is a lateral extension of said striker holding member, said force applying means of said striker means comprising a laterally extending cam-forming wall having a cam surface whose outer surface faces said lateral extension, said cam-forming wall inclining away from said lateral extension in the direction of movement of said striker means from its cocked to its uncocked position, said cam surface engaging said lateral extension of said striker holding member and moving the same outwardly to effect a flash operation when said striker means is moved from its cocked to its uncocked position, and said lateral extension on the striker holding member, when the holding member returns to its initial position after a flash operation, being located on the side of said cam-forming wall opposite the side including said outer surface as the wall passes thereby when the striker means is returned to its cocked position.

3. The still camera of claim 1 wherein said striker means includes flash unit rotating means responsive to the movement of the striker means from its uncocked to its cocked position to cause rotation of said flash unit-receiving means into a new position to bring a new section of a flash unit into position for firing.

4. In a still camera including a housing having shutter means operative to expose film in the housing, manually operable trigger means including a portion exposed to the outside of the camera housing for manual operation for operating the shutter means to effect a picture taking operation, manually operable shutter resetting means exposed to the outside of the housing for resetting the shutter means for operation by said manually operable trigger means, flash unit-receiving means mounted in said housing for rotation into a number of different operative stable positions and having an outer flash unit-receiving end exposed to the outside of the housing and adapted to support a multilamp flash unit of the percussive type having a number of flash lamp and reflector sections spaced around a central axis thereof coextensive with the axis of rotation of the flash unit-receiving member and each adapted to be fired by a flash unit actuator means to contact a flash producing portion thereof to effect a flash operation, striker and flash unit rotating means mounted for movement by said manually operable shutter resetting means from an uncocked to a cocked position, spring means urging said striker and flash unit rotating means from said cocked to said uncocked position, means for releasing said striker and flash unit rotating means from said cocked position upon operation of said manually operable trigger means unless hindered from doing so, said striker and flash unit rotating means including force applying means positioned only during the movement of said striker and flash unit rotating means from said cocked to said uncocked position and adapted to effect the movement of an actuator means operatively against the flash producing portion of the section of the flash unit facing forwardly, the improvement wherein said striker and flash unit rotating means is an assembly of a striker member which includes said force applying means and a flash rotating member pivotally mounted and carried upon said striker member for back and forth movement therewith and also for lateral movement relative thereto, said flash rotating member having a portion adapted operatively to engage a portion of the flash unit-receiving means to rotate the same only when the assembly of the striker and flash unit rotating members is moved in a direction to cock the same to rotate said flash unit-receiving means into a new position to bring a new section of a flash unit into position for firing, the flash unit rotating members being supported for lateral movement thereon so as to move inoperatively by the flash unit-receiving means when the assembly of the striker member and the flash unit rotating member is released from its cocked position, and striker holding means movable in response to the movement of a flash unit into and out of each flash unit-receiving means and having a position where a flash unit is removed therefrom for preventing the release of said striker and flash unit rotating means from said cocked position upon operation of said manually operable trigger means.

5. In a still camera including a housing having shutter means operative to expose film in the housing, manually operable trigger means including a portion exposed to the outside of the camera housing for manual operation for operating the shutter means to effect a picture taking operation, manually operable shutter resetting means exposed to the outside of the housing for resetting the shutter for operation by said manually operable trigger means, flash unit-receiving means mounted in said housing for rotation into a number of different operative stable positions and having an outer flash unit-receiving end exposed to the outside of the housing and adapted to support a multilamp flash unit of the percussive type having a number of flash lamp and reflector sections spaced around a central axis thereof coextensive with the axis of rotation of the flash unit-receiving member and each adapted to be fired by a flash unit actuator means to contact a flash producing portion thereof to effect a flash operation, striker and flash unit rotating means mounted for movement by said manually operable shutter resetting means from an uncocked to a cocked position, spring means urging said striker and flash unit rotating means from said cocked to said uncocked position, means for releasing said striker and flash unit rotating means from said cocked position upon operation of said manually operable trigger means unless hindered from doing so, said striker and flash unit rotating means including flash unit rotating means responsive to the movement of the striker and flash unit rotating means from its uncocked to its cocked position to rotate said flash unit-receiving means into position for firing, striker holding means responsive to the presence and absence of a flash unit from said flash unit-receiving means by assuming a first position upon the absence of a flash unit preventing the release of said striker and flash unit rotating means from said cocked position upon operation of said manually operably trigger means, said striker holding means also including as a part thereof an actuator portion which is positioned to engage the flash producing portion of a flash unit in said flash unit-receiving means, said striker holding means being spring urged into a position where said actuator portion thereof is in a reference position, said striker holding means having a lateral extension in the path of movement of a laterally extending cam-forming wall of said striker and flash unit rotating means when said striker holding means assumes a second position upon the presence of a flash unit which second position permits movement of said striker and flash unit rotating means to said uncocked position, said cam-forming wall having an outwardly facing cam surface facing said lateral extension of said striker holding means and moving the same outwardly to effect a flash operation when said striker and flash unit rotating means is moved from its cocked to its uncocked position, and said lateral extension on the striker holding means, when the holding means returns to its initial position after a flash operation, being located on the inside of same cam-forming wall as the wall passes thereby when the striker means is returned to its cocked position, the improvement wherein said flash unit-receiving means has spaced cam-forming means individually moved into an operative position as the flash unit receiving means is rotated into its different operative stable positions, and said striker holding means having cam-follower means responsive to the movement of said flash unit-receiving means by moving said lateral extension out of the path of movement of the flash unit operating portions of said cam-forming wall of said strike and flash unit rotating means during the cocking of said striker and flash unit rotating means.

6. The still camera of claim 5 wherein said cam-forming means of said flash unit-receiving means include spaced recesses each of which has on one side thereof a downwardly facing cam-forming wall means which when it is moved adjacent said striker holding means faces in the direction in which said striker and flash unit rotating means is moved into a cocked position, said cam-follower means of said striker holding means being normally located in one of said recesses, said cam-follower means being engaged by one of said cam-forming wall means and lowered thereby to hold the said lateral extension below the path of movement of the flash unit operating portion of said cam-forming wall of said striker and flash unit rotating means during the cocking thereof, said cam-follower means falling into one of the recesses when the flash unit rotating operation is completed.

* * * * *